US008770818B2

(12) United States Patent
Huang

(10) Patent No.: US 8,770,818 B2
(45) Date of Patent: Jul. 8, 2014

(54) SIDE-EDGE BACKLIGHT MODULE

(75) Inventor: Jianfa Huang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 195 days.

(21) Appl. No.: 13/583,223

(22) PCT Filed: Jul. 6, 2012

(86) PCT No.: PCT/CN2012/078258
§ 371 (c)(1), (2), (4) Date: Sep. 7, 2012

(87) PCT Pub. No.: WO2013/189102
PCT Pub. Date: Dec. 27, 2013

(65) Prior Publication Data

US 2013/0343087 A1 Dec. 26, 2013

(30) Foreign Application Priority Data

Jun. 21, 2012 (CN) .......................... 2012 1 0208325

(51) Int. Cl.
*F21V 8/00* (2006.01)

(52) U.S. Cl.
CPC .................................... *G02B 6/0011* (2013.01)
USPC ........................................... 362/613; 362/611

(58) Field of Classification Search
CPC ..................................................... G02B 6/0011
USPC .................................................. 362/611, 613
See application file for complete search history.

(56) References Cited

U.S. PATENT DOCUMENTS 7,866,869 B2 * 1/2011 Karakawa ..................... 362/613

FOREIGN PATENT DOCUMENTS

CN 202093200 U 12/2011

* cited by examiner

*Primary Examiner* — Stephen F Husar
*Assistant Examiner* — James Cranson, Jr.
(74) *Attorney, Agent, or Firm* — Andrew C. Cheng

(57) ABSTRACT

The present invention provides a side-edge backlight module including a light guide plate having first and second mounting sides opposite to each other. The first mounting side forms a first positioning hole, a first positioning slot, and a second positioning slot. The second mounting side forms correspondingly a second positioning hole, a third positioning slot, and a fourth positioning slot. A backplane includes six rivet pins respectively received in the first and second positioning holes and the first, second, third, and fourth positioning slots. The first and second positioning slots and the third and fourth positioning slots are of a right-angled trapezoidal shape having a straight side that is open and an inclined side that is inclined downward in a direction toward the first or second positioning hole. The rivet pins received in the first, second, third, and fourth positioning slots respectively abut against the inclined sides of the trapezoids.

11 Claims, 3 Drawing Sheets

300 304 102 100

SIDE-EDGE BACKLIGHT MODULE

BACKGROUND OF THE INVENTION

1. Field of the Invention

The present invention relates to the field of liquid crystal displaying, and in particular to a side-edge backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a back panel to be located rearward of one side of the liquid crystal panel. The LED light bar emits light that enters a light guide plate (LGP) through a light incident face of the light guide plate and is projected out through a light exit face of the light guide plate, after being reflected and diffused, to thereby transmit through an optic film assembly and form a planar light source for the liquid crystal panel.

In a side-edge backlight module, the positioning of the light guide plate is of vital importance. Two requirements must be satisfied for the positioning of the light guide plate, one being precision of positioning and the second stability of positioning taking tolerance, thermal expansion, absorption of wet into consideration. The currently adopted solutions for fixing include the following; (1) using an arrangement of fixing hole (as shown in FIG. 1), wherein a plurality of fixing holes 102 is formed in a mounting side of a light guide plate 100 in order to be retained by positioning rivets 304 formed on a backplane 300; and (2) using a tetragonal L-shaped rubber block to effect positioning. These known solutions of positioning cannot properly handle expansion caused by being heated or absorption of wet. When a light guide plate expands, the dimensions thereon in both length and width directions increase. Taking a 55" light guide plate made of PMMA (Poly(methyl methacrylate)) as an example, when the light guide plate is moved from room temperature (25° C.) into an oven of 40° C., the length increases by 2.8 mm A backplane made of an aluminum material will show an expansion length of 0.68 mm and the net amount of expansion will be 2 mm. By applying a simple mathematic model for calculation, if moving allowance for a light guide plate in the length direction in room temperature (25° C.) is zero, namely the light guide plate being incapable of moving in such a direction, then when the light guide plate undergoes thermal expansion by an amount of 2 mm, it can only bulge upward (as shown in FIG. 2). Calculation indicates that the bulging height H of the light guide plate is greater than 30 mm. Such a great amount of deformation would lead to the following problems. Firstly, the liquid crystal panel that is positioned on the top surface of the light guide plate will be broken or detached. The optic film assembly may undergo severe deformation and becomes waving (alternating of darkness and brightness for luminance). If the bulging is constrained through other measures, then the light guide plate would show multiple wavy warps that are of smaller bulging height, eventually leading to permanent deformation of the light guide plate, making it no longer possible to resume a flat and straight condition even after being cooled down. Thus, alternating of darkness and brightness of luminance may occur on the light guide plate.

SUMMARY OF THE INVENTION

An object of the present invention is to provide a side-edge backlight module, which comprises a light guide plate that does not warp after being heated or absorbing humidity so as to ensure normal operation of the backlight module in a high-temperature and high-humidity environment.

To achieve the above object, the present invention provides a side-edge backlight module, which comprises: a backplane, two backlight sources that are arranged in the backplane to be opposite to each other, and a light guide plate that is arranged inside the backplane and between the two backlight sources. The light guide plate comprises two opposite light incidence sides and a first mounting side and a second mounting side that are located between the two light incidence sides and are opposite to each other. The two backlight sources are set to respectively correspond to the two light incidence sides. The first mounting side forms a first positioning hole and also forms a first positioning slot and a third positioning slot on opposite sides of the first positioning hole. The second mounting side forms a second positioning hole corresponding to the first positioning hole. The second mounting side forms a second positioning slot and a fourth positioning slot on opposite sides of the second positioning hole to correspond to the first positioning slot and the third positioning slot. The backplane comprises six rivet pins mounted thereon to be respectively received in the first and second positioning holes and the first, second, third, and fourth positioning slots in order to effect positioning of the light guide plate. The first and third positioning slots are each of a right-angle trapezoidal shape with a straight side thereof open and an inclined side being inclined downward in a direction toward the first positioning hole. The second and fourth positioning slots are each of a right-angle trapezoidal shape with a straight side thereof open and an inclined side being inclined downward in a direction toward the second positioning hole. The rivet pins received in the first, second, third, and fourth positioning slots respectively abut against the inclined sides of the trapezoids.

The first mounting side forms the first positioning hole in a middle position thereof and corresponding to the first positioning hole, the second mounting side forms the second positioning hole in a middle position thereof.

The first and second positioning holes are of a rectangular shape having one side open, whereby in room temperature, the rivet pin received in the second positioning hole abuts against a bottom side of the second positioning hole, while the rivet pin received in the first positioning hole is spaced from the bottom side of the first positioning hole by a first distance to serve as a preserved space for expansion of the light guide plate in the direction of the first and second positioning holes. The first distance is determined according to difference in thermal expansion of the light guide plate and the backplane.

In room temperature, the rivet pin received in the first positioning slot abuts against a top end of the inclined side of the trapezoid of the first positioning slot and the rivet pin received in the first positioning slot abuts against the top of the trapezoid of the first positioning slot. The rivet pin received in the first positioning slot is spaced from the bottom of the trapezoid of the first positioning slot by a second distance to serve as a preserved space for expansion of the light guide plate in the direction of the first and third positioning slots. The second distance is determined according to difference in thermal expansion between the light guide plate and the backplane. In room temperature, the rivet pin received in the third positioning slot abuts against a top end of the inclined side of the trapezoid of the third positioning slot and the rivet pin received in the third positioning slot abuts against the top of the trapezoid of the third positioning slot. The rivet pin received in the third positioning slot is spaced from the bottom of the trapezoid of the third positioning slot by a third distance to serve as a preserved space for expansion of the light guide plate in the direction of the first and third positioning slots. The third distance is determined according to difference in thermal expansion between the light guide plate and the backplane.

In room temperature, the rivet pin received in the second positioning slot abuts against a top end of the inclined side of the trapezoid of the second positioning slot and the rivet pin received in the second positioning slot abuts against the bottom of the trapezoid of the second positioning slot. The rivet pin received in the second positioning slot is spaced from the top of the trapezoid of the second positioning slot by a fourth distance to serve as a preserved space for expansion of the light guide plate in the direction of the second and fourth positioning slots. The fourth distance is determined according to difference in thermal expansion between the light guide plate and the backplane. In room temperature, the rivet pin received in the fourth positioning slot abuts against a top end of the inclined side of the trapezoid of the fourth positioning slot and the rivet pin received in the fourth positioning slot abuts against the bottom of the trapezoid of the fourth positioning slot. The rivet pin received in the fourth positioning slot is spaced from the top of the trapezoid of the fourth positioning slot by a fifth distance to serve as a preserved space for expansion of the light guide plate in the direction of the second and fourth positioning slots. The fifth distance is determined according to difference in thermal expansion between the light guide plate and the backplane.

Length of the bottom of the first positioning slot minus length of the top of the first positioning slot and further minus a sixth distance is equal to length of the bottom of the second positioning slot minus length of the top of the second positioning slot and the sixth distance is a preserved space for expansion of the light guide plate in the direction of the first and second positioning slots. Length of the bottom of the third positioning slot minus length of the top of the third positioning slot and further minus a seventh distance is equal to length of the bottom of the fourth positioning slot minus length of the top of the fourth positioning slot and the seventh distance is a preserved space for expansion of the light guide plate in the direction of the third and fourth positioning slots.

The present invention also provides a side-edge backlight module, which comprises: a backplane, two backlight sources that are arranged in the backplane to be opposite to each other, and a light guide plate that is arranged inside the backplane and between the two backlight sources, the light guide plate comprising two opposite light incidence sides and a first mounting side and a second mounting side that are located between the two light incidence sides and are opposite to each other, the two backlight sources being set to respectively correspond to the two light incidence sides, the first mounting side forming a first positioning hole and also forming a first positioning slot and a third positioning slot on opposite sides of the first positioning hole, the second mounting side forming a second positioning hole corresponding to the first positioning hole, the second mounting side forming a second positioning slot and a fourth positioning slot on opposite sides of the second positioning hole to correspond to the first positioning slot and the third positioning slot, the backplane comprising six rivet pins mounted thereon to be respectively received in the first and second positioning holes and the first, second, third, and fourth positioning slots in order to effect positioning of the light guide plate, the first and third positioning slots being each of a right-angle trapezoidal shape with a straight side thereof open and an inclined side being inclined downward in a direction toward the first positioning hole, the second and fourth positioning slots being each of a right-angle trapezoidal shape with a straight side thereof open and an inclined side being inclined downward in a direction toward the second positioning hole, the rivet pins received in the first, second, third, and fourth positioning slots respectively abutting against the inclined sides of the trapezoids;

wherein the first mounting side forms the first positioning hole in a middle position thereof and corresponding to the first positioning hole, the second mounting side forms the second positioning hole in a middle position thereof;

wherein the first and second positioning holes are of a rectangular shape having one side open, whereby in room temperature, the rivet pin received in the second positioning hole abuts against a bottom side of the second positioning hole, while the rivet pin received in the first positioning hole is spaced from the bottom side of the first positioning hole by a first distance to serve as a preserved space for expansion of the light guide plate in the direction of the first and second positioning holes, the first distance being determined according to difference in thermal expansion of the light guide plate and the backplane;

wherein in room temperature, the rivet pin received in the first positioning slot abuts against a top end of the inclined side of the trapezoid of the first positioning slot and the rivet pin received in the first positioning slot abuts against the top of the trapezoid of the first positioning slot, the rivet pin received in the first positioning slot being spaced from the bottom of the trapezoid of the first positioning slot by a second distance to serve as a preserved space for expansion of the light guide plate in the direction of the first and third positioning slots, the second distance being determined according to difference in thermal expansion between the light guide plate and the backplane; and in room temperature, the rivet pin received in the third positioning slot abuts against a top end of the inclined side of the trapezoid of the third positioning slot and the rivet pin received in the third positioning slot abuts against the top of the trapezoid of the third positioning slot, the rivet pin received in the third positioning slot being spaced from the bottom of the trapezoid of the third positioning slot by a third distance to serve as a preserved space for expansion of the light guide plate in the direction of the first and third positioning slots, the third distance being determined according to difference in thermal expansion between the light guide plate and the backplane;

wherein in room temperature, the rivet pin received in the second positioning slot abuts against a top end of the inclined side of the trapezoid of the second positioning slot and the rivet pin received in the second positioning slot abuts against the bottom of the trapezoid of the second positioning slot, the rivet pin received in the second positioning slot being spaced from the top of the trapezoid of the second positioning slot by a fourth distance to serve as a preserved space for expansion of the light guide plate in the direction of the second and fourth positioning slots, the fourth distance being determined according to difference in thermal expansion between the light guide plate and the backplane; and in room temperature, the rivet pin received in the fourth positioning slot abuts against a top end of the inclined side of the trapezoid of the fourth positioning slot and the rivet pin received in the fourth positioning slot abuts against the bottom of the trapezoid of the fourth positioning slot, the rivet pin received in the fourth positioning slot being spaced from the top of the trapezoid of the fourth positioning slot by a fifth distance to serve as a preserved space for expansion of the light guide plate in the direction of the second and fourth positioning slots, the fifth distance being determined according to difference in thermal expansion between the light guide plate and the backplane; and wherein length of the bottom of the first positioning slot minus length of the top of the first positioning slot and further minus a sixth distance is equal to length of the bottom of the second positioning slot minus length of the top of the second positioning slot, the sixth distance being a preserved space for expansion of the light guide plate in the direction of the first and second positioning slots; and length of the bottom of the third positioning slot minus length of the top of the third positioning slot and further minus a seventh distance is equal to length of the bottom of the fourth positioning slot minus length of the top of the fourth positioning slot, the seventh distance being a preserved space for expansion of the light guide plate in the direction of the third and fourth positioning slots.

The present invention further provides a side-edge backlight module, which comprises: a backplane, a backlight source arranged inside the backplane, and a light guide plate arranged inside the backplane and corresponding to the backlight source. The light guide plate comprises a light incidence side and a first mounting side and a second mounting side that are opposite to each other and are located at two ends of the light incidence side. The backlight source is set to correspond to the light incidence side. The first mounting side forms a first positioning hole and two first positioning slots. The second mounting side forms a second positioning hole corresponding to the first positioning hole. The second mounting side forms two second positioning slots to respectively correspond to the first positioning slots. The backplane comprises six rivet pins mounted thereon to be respectively received in the first and second positioning holes and the first and second positioning slots in order to effect positioning of the light guide plate. The first positioning slots are of a right-angle trapezoidal shape with a straight side thereof open and an inclined side being inclined downward in a direction toward the first positioning hole. The second positioning slots are of a right-angle trapezoidal shape with a straight side thereof open and an inclined side being inclined downward in a direction toward the second positioning hole. The rivet pins received in the first and second positioning slots abut against the inclined sides of the trapezoids.

The first mounting side forms, at a position close to the light incidence side, a first positioning hole and also forms, in a middle position and an end position remote from the first positioning hole, first positioning slots. Corresponding to the first positioning hole, the second mounting side forms, at a position close to the light incidence side, a second positioning hole and corresponding to the first positioning slots, the second mounting side forms, in a middle position and an end position remote from the second positioning hole, second positioning slots.

The first and second positioning holes are of a rectangular shape having one side open, whereby in room temperature, the rivet pin received in the second positioning hole abuts against a bottom side of the second positioning hole, while the rivet pin received in the first positioning hole is spaced from the bottom side of the first positioning hole by a first distance to serve as a preserved space for expansion of the light guide plate in the direction of the first and second positioning holes. The first distance is determined according to difference in thermal expansion of the light guide plate and the backplane. The rivet pins received in the first and second positioning holes are respectively in contact engagement with two lateral sides of the first and second positioning holes.

In room temperature, the rivet pins received in the first positioning slots abut against top ends of the inclined sides of the trapezoids of the first positioning slots and the rivet pins received in the first positioning slots abut against the tops of the trapezoids of the first positioning slots. The rivet pins received in the first positioning slots are spaced from the bottoms of the trapezoids of the first positioning slots by a second distance to serve as a preserved space for expansion of the light guide plate in the direction of the first positioning slots. The second distance is determined according to difference in thermal expansion between the light guide plate and the backplane. In room temperature, the rivet pins received in the second positioning slots abut against top ends of the inclined sides of the trapezoids of the second positioning slots and the rivet pins received in the second positioning slots abut against the bottoms of the trapezoids of the second positioning slots. The rivet pins received in the second positioning slots are spaced from the tops of the trapezoids of the second positioning slots by a third distance to serve as a preserved space for expansion of the light guide plate in the direction of the second positioning slots. The third distance is determined according to difference in thermal expansion between the light guide plate and the backplane. Length of the bottoms of the first positioning slots minus length of the tops of the first positioning slots and further minus a fourth distance is equal to length of the bottoms of the second positioning slots minus length of the tops of the second positioning slots and the fourth distance is a preserved space for expansion of the light guide plate in the direction of the first and second positioning slots. The fourth distance is determined according to different in thermal expansion between the light guide plate and the backplane.

The efficacy of the present invention is that the present invention provides a side-edge backlight module, wherein with the arrangement of the trapezoidal positioning slots, the light guide plate and the rivet pins are kept in tight engagement with each other to eliminate excessively large free moving space for the light guide plate thereby effectively positioning the light guide plate and preventing the light guide plate from warping caused by expansion.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
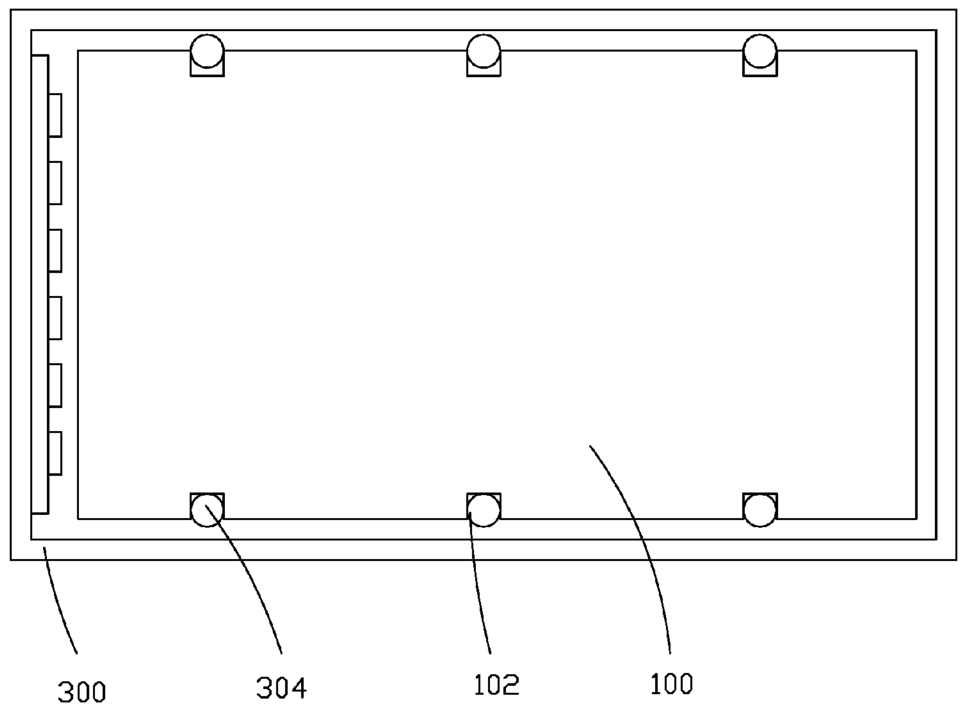
FIG. 1 is a schematic view showing a light guide plate fixing structure for a conventional side-edge backlight module.
Figure 2:
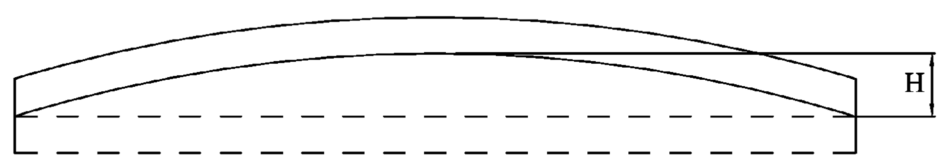
FIG. 2 is a schematic view showing expansion and warp of the conventional light guide plate.
Figure 3:
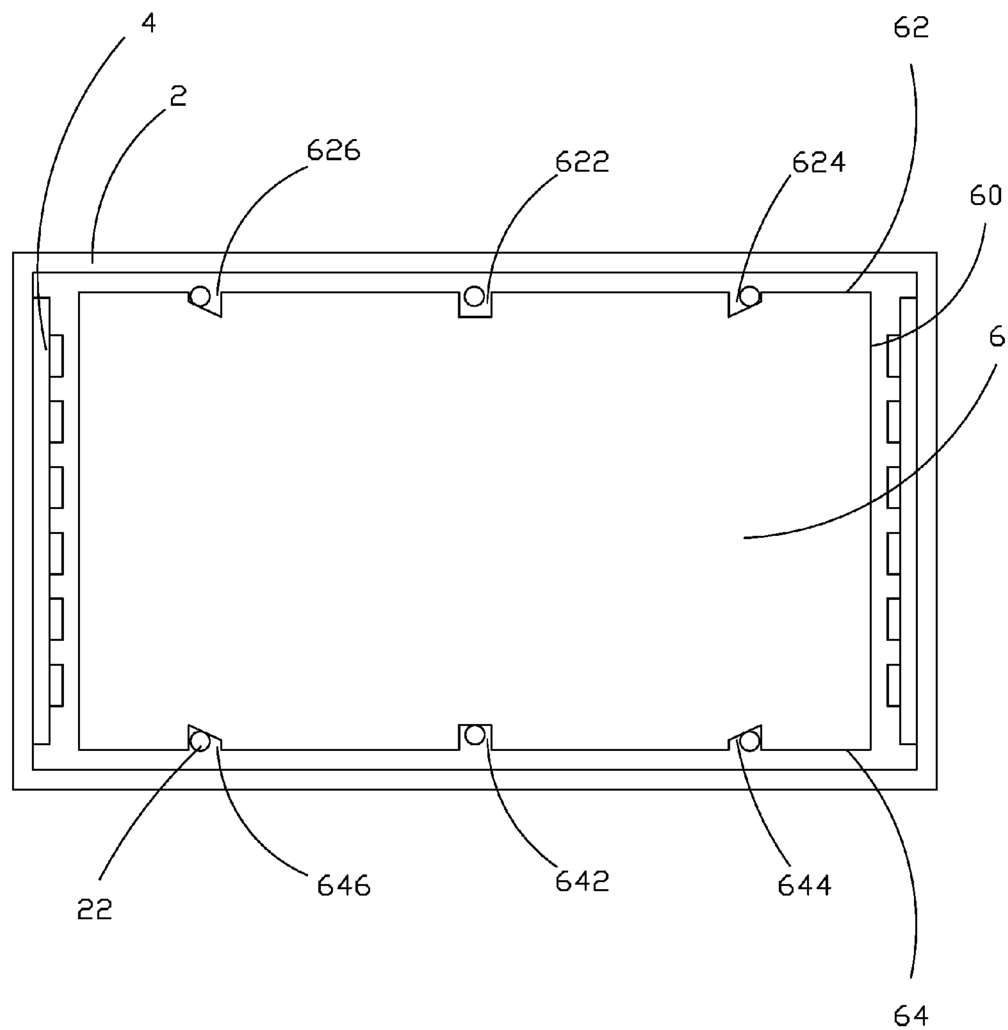
FIG. 3 is a schematic view illustrating an embodiment of side-edge backlight module according to the present invention.

Referring to FIG. 3, the present invention provides a side-edge backlight module. The backlight module can be a dual-side incidence backlight module and comprises: a backplane 2, two backlight sources 4 that are arranged in the backplane 2 to be opposite to each other, and a light guide plate 6 that is arranged inside the backplane 2 and between the two backlight sources 4.

The light guide plate 6 comprises two opposite light incidence sides 60 and a first mounting side 62 and a second mounting side 64 that are located between the two light incidence sides 60 and are opposite to each other. The two backlight sources 4 are set to respectively correspond to the two light incidence sides 60. In a normal use, the first mounting side 62 is set to face upward, while the second mounting side 64 faces downward. The first mounting side 62, forms in a middle position thereof, a first positioning hole 622 and also forms a first positioning slot 624 and a second positioning slot 626 on opposite sides of the first positioning hole 622. Corresponding to the first positioning hole 622, the second mounting side 64 forms, in a middle position thereof, a second positioning hole 642 and corresponding to the first and second positioning slots 624, 626, the second mounting side 64 forms a third and a fourth positioning slots 644, 646 on opposite sides of the second positioning hole.

The backplane 2 comprises six rivet pins 22 mounted thereon to be respectively received in the first and second positioning holes 622, 642 and the first, second, third, and fourth positioning slots 624, 644, 626, 646 in order to effect positioning of the light guide plate 6.

The first and second positioning holes 622, 642 are of a rectangular shape having one side open. In room temperature (25° C.), the rivet pin 22 received in the second positioning hole 642 abuts against a bottom side of the second positioning hole 642, while the rivet pin 22 received in the first positioning hole 622 is spaced from the bottom side of the first positioning hole 622 by a first distance to serve as a preserved space for expansion of the light guide plate 6 in the direction of the first and second positioning holes 622, 642. The first distance is determined according to the difference in thermal expansion of the light guide plate and the backplane, and specifically speaking, is affected by the size, material, and test conditions of RA (Reliability Analysis) of the light guide plate and the material of the backplane. Taking a 55" light guide plate made of PMMA and a backplane made of an aluminum material as an example, the first distance is 1 mm. The rivet pins 22 received in the first and second positioning holes 622, 642 are respectively in contact engagement with two lateral sides of the first and second positioning holes 622, 642.

The first positioning slot 624 is of a right-angle trapezoidal shape with a straight side thereof open and an inclined side being inclined downward in a direction toward the first positioning hole 622. In room temperature (25° C.), the rivet pin 22 received in the first positioning slot 624 abuts against a top end of the inclined side of the trapezoid of the first positioning slot 624 and the rivet pin 22 received in the first positioning slot 624 abuts against the top of the trapezoid of the first positioning slot 624. The rivet pin 22 received in the first positioning slot 624 is spaced from the bottom of the trapezoid of the first positioning slot 624 by a second distance to serve as a preserved space for expansion of the light guide plate 6 in the direction of the first and third positioning slots 624, 626. The second distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the second distance is 2 mm.

The third positioning slot 626 is of a right-angle trapezoidal shape with a straight side thereof open and an inclined side being inclined downward in a direction toward the first positioning hole 622. In room temperature (25° C.), the rivet pin 22 received in the third positioning slot 626 abuts against a top end of the inclined side of the trapezoid of the third positioning slot 626 and the rivet pin 22 received in the third positioning slot 626 abuts against the top of the trapezoid of the third positioning slot 626. The rivet pin 22 received in the third positioning slot 626 is spaced from the bottom of the trapezoid of the third positioning slot 626 by a third distance to serve as a preserved space for expansion of the light guide plate 6 in the direction of the first and third positioning slots 624, 626. The third distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the third distance is 2 mm.

The second positioning slot 644 is of a right-angle trapezoidal shape with a straight side thereof open and an inclined side being inclined downward in a direction toward the second positioning hole 642. In room temperature (25° C.), the rivet pin 22 received in the second positioning slot 644 abuts against a top end of the inclined side of the trapezoid of the second positioning slot 644 and the rivet pin 22 received in the second positioning slot 644 abuts against the bottom of the trapezoid of the second positioning slot 644. The rivet pin 22 received in the second positioning slot 644 is spaced from the top of the trapezoid of the second positioning slot 644 by a fourth distance to serve as a preserved space for expansion of the light guide plate 6 in the direction of the second and fourth positioning slots 644, 646. The fourth distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the fourth distance is 2 mm.

The fourth positioning slot 646 is of a right-angle trapezoidal shape with a straight side thereof open and an inclined side being inclined downward in a direction toward the second positioning hole 642. In room temperature (25° C.), the rivet pin 22 received in the fourth positioning slot 646 abuts against a top end of the inclined side of the trapezoid of the fourth positioning slot 646 and the rivet pin 22 received in the fourth positioning slot 646 abuts against the bottom of the trapezoid of the fourth positioning slot 646. The rivet pin 22 received in the fourth positioning slot 646 is spaced from the top of the trapezoid of the fourth positioning slot 646 by a fifth distance to serve as a preserved space for expansion of the light guide plate 6 in the direction of the second and fourth positioning slots 644, 646. The fifth distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the fifth distance is 2 mm.

The top of the trapezoid of the first positioning slot 624 has a length identical to that of the top of the trapezoid of the second positioning slot 644. The straight side of the trapezoid of the first positioning slot 624 has a length identical to that of the straight side of the trapezoid of the second positioning slot 644. The bottom of the trapezoid of the first positioning slot 624 has a length greater than that of the bottom of the trapezoid of the second positioning slot 644 by a sixth distance to serve as a preserved space for expansion of the light guide plate in the direction of the first and second positioning slots 624, 644. The sixth distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the sixth distance is 1 mm. As a possible variation, if the top of the trapezoid of the first positioning slot 624 has a length that is different from that of top of the trapezoid of the second positioning slot 644, then the length of the bottom of the first positioning slot 624 minus the length of the top of the first positioning slot 624 and further minus the sixth distance is equal to the length of the bottom of the second positioning slot 644 minus the length of the top of the second positioning slot 644.

Similarly, the top of the trapezoid of the third positioning slot 626 has a length identical to that of the top of the trapezoid of the fourth positioning slot 646. The straight side of the trapezoid of the third positioning slot 626 has a length identical to that of the straight side of the trapezoid of the fourth positioning slot 646. The bottom of the trapezoid of the third positioning slot 626 has a length greater than that of the bottom of the trapezoid of the fourth positioning slot 646 by a seventh distance to serve as a preserved space for expansion of the light guide plate in the direction of the third and fourth positioning slots 626, 646. The seventh distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the seventh distance is 1 mm. As a possible variation, if the top of the trapezoid of the third positioning slot 626 has a length that is different from that of top of the trapezoid of the fourth positioning slot 646, then the length of the bottom of the third positioning slot 626 minus the length of the top of the third positioning slot 626 and further minus the seventh distance is equal to the length of the bottom of the fourth positioning slot 646 minus the length of the top of the fourth positioning slot 646.

Of course, the number of the positioning slots can be modified according the size of or other requirements for the light guide plate.

The cooperative positioning between the positioning holes and the positioning slots and the rivet pins according to the present invention allows, under the condition that the position of the light guide plate is secured, the light guide plate to extend in two perpendicular directions when the light guide plate expands so as to prevent the light guide plate from warping.

For side-edge backlight modules of different sizes, the sizes of the light guide plate are different and the expansion lengths thereof are also different. However, according to the fixing manner described above, in fixing any light guide plate, the sizes and locations of the positioning holes, the positioning slots, and the rivet pins may be modified in a corresponding manner to ensure the light guide plate does not undergo undesired problems of warp and deformation even when placed in an oven of 40° C. for a long time. For products that must be handled in an even higher temperature, it is only necessary to save a greater amount of expansion space for the light guide plate to eliminate the problem of deformation of the light guide plate.

Figure 4:
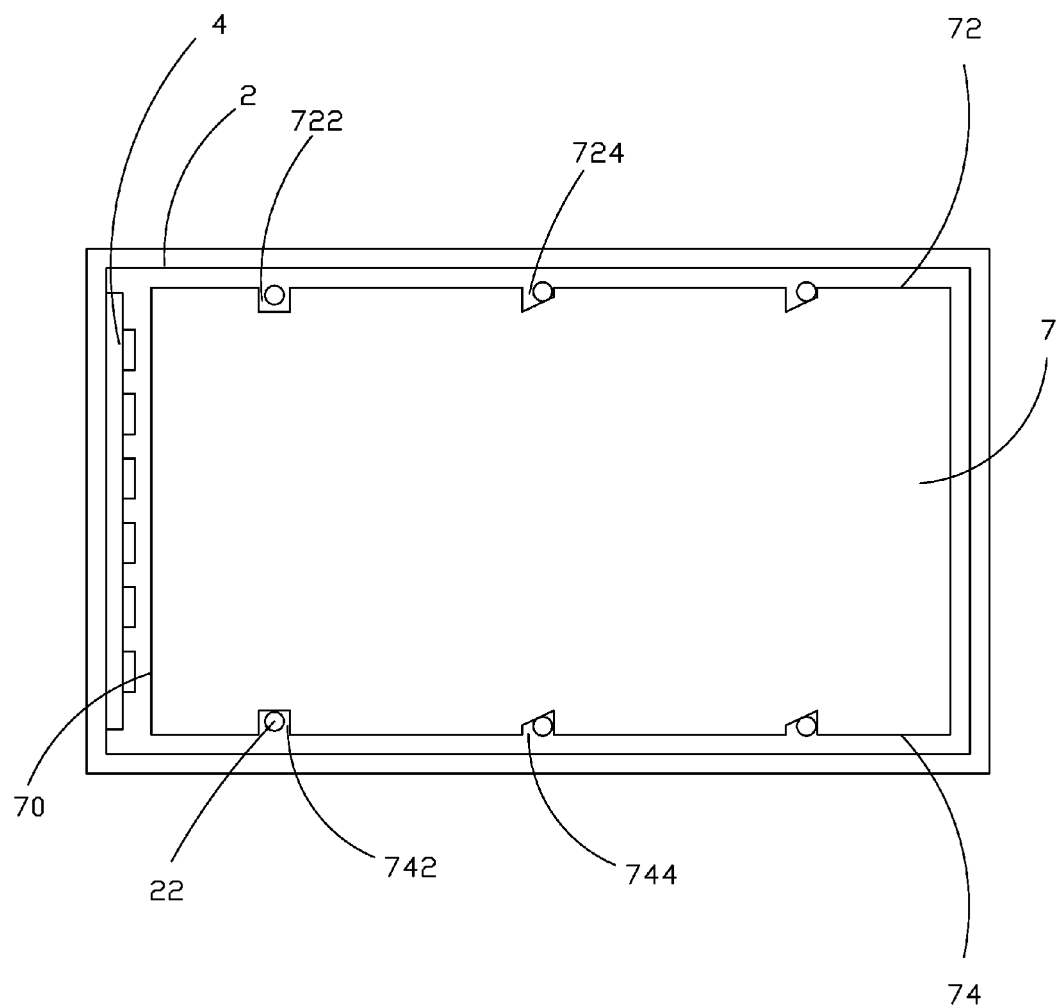
FIG. 4 is a schematic view showing another embodiment of side-edge backlight module according to the present invention.

Referring to FIG. 4, which is a schematic view showing another embodiment of the side-edge backlight module according to the present invention, the side-edge backlight module of the instant embodiment is a single-side incidence backlight module and comprises: a backplane 2, a backlight source 4 arranged inside the backplane 2, and a light guide plate 7 arranged inside the backplane 2 and corresponding to the backlight source 4.

The light guide plate 7 comprises a light incidence side 70 and a first mounting side 72 and a second mounting side 74 that are opposite to each other and are located at two ends of the light incidence side 70. The backlight source 4 is set to correspond to the light incidence side 70. In a normal use, the first mounting side 72 is set to face upward, while the second mounting side 74 faces downward. The first mounting side 72 forms, at a position close to the light incidence side 70, a first positioning hole 722 and also forms, in a middle position and an end position remote from the first positioning hole 722, first positioning slots 724. Corresponding to the first positioning hole 722, the second mounting side 74 forms, at a position close to the light incidence side 70, a second positioning hole 742 and corresponding to the first positioning slots 724, the second mounting side 74 forms, in a middle position and an end position remote from the second positioning hole 742, second positioning slots 744.

The backplane 2 comprises six rivet pins 22 mounted thereon to be respectively received in the first and second positioning holes 722, 742 and the first and second positioning slots 724, 744 in order to effect positioning of the light guide plate 7.

The first and second positioning holes 722, 742 are of a rectangular shape having one side open. In room temperature (25° C.), the rivet pin 22 received in the second positioning hole 742 abuts against a bottom side of the second positioning hole 742, while the rivet pin 22 received in the first positioning hole 722 is spaced from the bottom side of the first positioning hole 722 by a first distance to serve as a preserved space for expansion of the light guide plate 7 in the direction of the first and second positioning holes 722, 742. The first distance is determined according to the difference in thermal expansion of the light guide plate and the backplane, and specifically speaking, is affected by the size, material, and test conditions of RA of the light guide plate and the material of the backplane. Taking a 55" light guide plate made of PMMA and a backplane made of an aluminum material as an example, the first distance is 1 mm. The rivet pins 22 received in the first and second positioning holes 722, 742 are respectively in contact engagement with two lateral sides of the first and second positioning holes 722, 742.

The first positioning slots 724 are of a right-angle trapezoidal shape with a straight side thereof open and an inclined side being inclined downward in a direction toward the first positioning hole 722. In room temperature (25° C.), the rivet pin 22 received in each of the first positioning slots 724 abuts against a top end of the inclined side of the trapezoid of the first positioning slot 724 and the rivet pin 22 received in each of the first positioning slots 724 abuts against the top of the trapezoid of the first positioning slot 724. The rivet pin 22 received in each of the first positioning slots 724 is spaced from the bottom of the trapezoid of the first positioning slot 724 by a second distance to serve as a preserved space for expansion of the light guide plate 7 in the direction of the first positioning slots 724. The second distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the second distance is 2 mm.

The second positioning slots 744 are of a right-angle trapezoidal shape with a straight side thereof open and an inclined side being inclined downward in a direction toward the second positioning hole 742. In room temperature (25° C.), the rivet pin 22 received in each of the second positioning slots 744 abuts against a top end of the inclined side of the trapezoid of the second positioning slot 744 and the rivet pin 22 received in each of the second positioning slots 744 abuts against the bottom of the trapezoid of the second positioning slot 744. The rivet pin 22 received in each of the second positioning slots 744 is spaced from the top of the trapezoid of the second positioning slot 744 by a third distance to serve as a preserved space for expansion of the light guide plate 7 in the direction of the second positioning slots 744. The third distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the third distance is 2 mm.

The top of the trapezoid of the first positioning slots 724 has a length identical to that of the top of the trapezoid of the second positioning slots 744. The straight side of the trapezoid of the first positioning slots 724 has a length identical to that of the straight side of the trapezoid of the second positioning slots 744. The bottom of the trapezoid of the first positioning slots 724 has a length greater than that of the bottom of the trapezoid of the second positioning slots 744 by a fourth distance to serve as a preserved space for expansion of the light guide plate in the direction of the first and second positioning slots 724, 744. The fourth distance is determined according to the difference in thermal expansion between the light guide plate and the backplane and specifically speaking, is affected by the size, material, and test conditions of RA of the light guide plate and the material of the backplane. Taking a 55" light guide plate made of PMMA and a backplane made of an aluminum material as an example, the fourth distance is 1 mm. As a possible variation, if the top of the trapezoid of the first positioning slots 724 has a length that is different from that of top of the trapezoid of the second positioning slots 744, then the length of the bottom of the first positioning slots 724 minus the length of the top of the first positioning slots 724 and further minus the fourth distance is equal to the length of the bottom of the second positioning slots 744 minus the length of the top of the second positioning slots 744.

Of course, the number of the positioning slots can be modified according the size of or other requirements for the light guide plate.

The cooperative positioning between the positioning holes and the positioning slots and the rivet pins according to the present invention allows, under the condition that the position of the light guide plate is secured, the light guide plate to extend in two perpendicular directions when the light guide plate expands so as to prevent the light guide plate from warping.

For side-edge backlight modules of different sizes, the sizes of the light guide plate are different and the expansion lengths thereof are also different. However, according to the fixing manner described above, in fixing any light guide plate, the sizes and locations of the positioning holes, the positioning slots, and the rivet pins may be modified in a corresponding manner to ensure the light guide plate does not undergo undesired problems of warp and deformation even when placed in an oven of 40° C. for a long time. For products that must be handled in an even higher temperature, it is only necessary to save a greater amount of expansion space for the light guide plate to eliminate the problem of deformation of the light guide plate.

In summary, the present invention provides a side-edge backlight module, wherein with the arrangement of the trapezoidal positioning slots, the light guide plate and the rivet pins are kept in tight engagement with each other to eliminate excessively large free moving space for the light guide plate thereby effectively positioning the light guide plate and preventing the light guide plate from warping caused by expansion.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A side-edge backlight module, comprising: a backplane, two backlight sources that are arranged in the backplane to be opposite to each other, and a light guide plate that is arranged inside the backplane and between the two backlight sources, the light guide plate comprising two opposite light incidence sides and a first mounting side and a second mounting side that are located between the two light incidence sides and are opposite to each other, the two backlight sources being set to respectively correspond to the two light incidence sides, the first mounting side forming a first positioning hole and also forming a first positioning slot and a third positioning slot on opposite sides of the first positioning hole, the second mounting side forming a second positioning hole corresponding to the first positioning hole, the second mounting side forming a second positioning slot and a fourth positioning slot on opposite sides of the second positioning hole to correspond to the first positioning slot and the third positioning slot, the backplane comprising six rivet pins mounted thereon to be respectively received in the first and second positioning holes and the first, second, third, and fourth positioning slots in order to effect positioning of the light guide plate, the first and third positioning slots being each of a right-angle trapezoidal shape with a straight side thereof open and an inclined side being inclined downward in a direction toward the first positioning hole, the second and fourth positioning slots being each of a right-angle trapezoidal shape with a straight side thereof open and an inclined side being inclined downward in a direction toward the second positioning hole, the rivet pins received in the first, second, third, and fourth positioning slots respectively abutting against the inclined sides of the trapezoids.

2. The side-edge backlight module as claimed in claim 1, wherein the first mounting side forms the first positioning hole in a middle position thereof and corresponding to the first positioning hole, the second mounting side forms the second positioning hole in a middle position thereof.

3. The side-edge backlight module as claimed in claim 1, wherein the first and second positioning holes are of a rectangular shape having one side open, whereby in room temperature, the rivet pin received in the second positioning hole abuts against a bottom side of the second positioning hole, while the rivet pin received in the first positioning hole is spaced from the bottom side of the first positioning hole by a first distance to serve as a preserved space for expansion of the light guide plate in the direction of the first and second positioning holes, the first distance being determined according to difference in thermal expansion of the light guide plate and the backplane.

4. The side-edge backlight module as claimed in claim 1, wherein in room temperature, the rivet pin received in the first positioning slot abuts against a top end of the inclined side of the trapezoid of the first positioning slot and the rivet pin received in the first positioning slot abuts against the top of the trapezoid of the first positioning slot, the rivet pin received in the first positioning slot being spaced from the bottom of the trapezoid of the first positioning slot by a second distance to serve as a preserved space for expansion of the light guide plate in the direction of the first and third positioning slots, the second distance being determined according to difference in thermal expansion between the light guide plate and the backplane; and in room temperature, the rivet pin received in the third positioning slot abuts against a top end of the inclined side of the trapezoid of the third positioning slot and the rivet pin received in the third positioning slot abuts against the top of the trapezoid of the third positioning slot, the rivet pin received in the third positioning slot being spaced from the bottom of the trapezoid of the third positioning slot by a third distance to serve as a preserved space for expansion of the light guide plate in the direction of the first and third positioning slots, the third distance being determined according to difference in thermal expansion between the light guide plate and the backplane.

5. The side-edge backlight module as claimed in claim 1, wherein in room temperature, the rivet pin received in the second positioning slot abuts against a top end of the inclined side of the trapezoid of the second positioning slot and the rivet pin received in the second positioning slot abuts against the bottom of the trapezoid of the second positioning slot, the rivet pin received in the second positioning slot being spaced from the top of the trapezoid of the second positioning slot by a fourth distance to serve as a preserved space for expansion of the light guide plate in the direction of the second and fourth positioning slots, the fourth distance being determined according to difference in thermal expansion between the light guide plate and the backplane; and in room temperature, the rivet pin received in the fourth positioning slot abuts against a top end of the inclined side of the trapezoid of the fourth positioning slot and the rivet pin received in the fourth positioning slot abuts against the bottom of the trapezoid of the fourth positioning slot, the rivet pin received in the fourth positioning slot being spaced from the top of the trapezoid of the fourth positioning slot by a fifth distance to serve as a preserved space for expansion of the light guide plate in the direction of the second and fourth positioning slots, the fifth distance being determined according to difference in thermal expansion between the light guide plate and the backplane.

6. The side-edge backlight module as claimed in claim 1, wherein length of the bottom of the first positioning slot minus length of the top of the first positioning slot and further minus a sixth distance is equal to length of the bottom of the second positioning slot minus length of the top of the second positioning slot, the sixth distance being a preserved space for expansion of the light guide plate in the direction of the first and second positioning slots; and length of the bottom of the third positioning slot minus length of the top of the third positioning slot and further minus a seventh distance is equal to length of the bottom of the fourth positioning slot minus length of the top of the fourth positioning slot, the seventh distance being a preserved space for expansion of the light guide plate in the direction of the third and fourth positioning slots.

7. A side-edge backlight module, comprising: a backplane, two backlight sources that are arranged in the backplane to be opposite to each other, and a light guide plate that is arranged inside the backplane and between the two backlight sources, the light guide plate comprising two opposite light incidence sides and a first mounting side and a second mounting side that are located between the two light incidence sides and are opposite to each other, the two backlight sources being set to respectively correspond to the two light incidence sides, the first mounting side forming a first positioning hole and also forming a first positioning slot and a third positioning slot on opposite sides of the first positioning hole, the second mounting side forming a second positioning hole corresponding to the first positioning hole, the second mounting side forming a second positioning slot and a fourth positioning slot on opposite sides of the second positioning hole to correspond to the first positioning slot and the third positioning slot, the backplane comprising six rivet pins mounted thereon to be respectively received in the first and second positioning holes and the first, second, third, and fourth positioning slots in order to effect positioning of the light guide plate, the first and third positioning slots being each of a right-angle trapezoidal shape with a straight side thereof open and an inclined side being inclined downward in a direction toward the first positioning hole, the second and fourth positioning slots being each of a right-angle trapezoidal shape with a straight side thereof open and an inclined side being inclined downward in a direction toward the second positioning hole, the rivet pins received in the first, second, third, and fourth positioning slots respectively abutting against the inclined sides of the trapezoids;

wherein the first mounting side forms the first positioning hole in a middle position thereof and corresponding to the first positioning hole, the second mounting side forms the second positioning hole in a middle position thereof;

wherein the first and second positioning holes are of a rectangular shape having one side open, whereby in room temperature, the rivet pin received in the second positioning hole abuts against a bottom side of the second positioning hole, while the rivet pin received in the first positioning hole is spaced from the bottom side of the first positioning hole by a first distance to serve as a preserved space for expansion of the light guide plate in the direction of the first and second positioning holes, the first distance being determined according to difference in thermal expansion of the light guide plate and the backplane;

wherein in room temperature, the rivet pin received in the first positioning slot abuts against a top end of the inclined side of the trapezoid of the first positioning slot and the rivet pin received in the first positioning slot abuts against the top of the trapezoid of the first positioning slot, the rivet pin received in the first positioning slot being spaced from the bottom of the trapezoid of the first positioning slot by a second distance to serve as a preserved space for expansion of the light guide plate in the direction of the first and third positioning slots, the second distance being determined according to difference in thermal expansion between the light guide plate and the backplane; and in room temperature, the rivet pin received in the third positioning slot abuts against a top end of the inclined side of the trapezoid of the third positioning slot and the rivet pin received in the third positioning slot abuts against the top of the trapezoid of the third positioning slot, the rivet pin received in the third positioning slot being spaced from the bottom of the trapezoid of the third positioning slot by a third distance to serve as a preserved space for expansion of the light guide plate in the direction of the first and third positioning slots, the third distance being determined according to difference in thermal expansion between the light guide plate and the backplane;

wherein in room temperature, the rivet pin received in the second positioning slot abuts against a top end of the inclined side of the trapezoid of the second positioning slot and the rivet pin received in the second positioning slot abuts against the bottom of the trapezoid of the second positioning slot, the rivet pin received in the second positioning slot being spaced from the top of the trapezoid of the second positioning slot by a fourth distance to serve as a preserved space for expansion of the light guide plate in the direction of the second and fourth positioning slots, the fourth distance being determined according to difference in thermal expansion between the light guide plate and the backplane; and in room temperature, the rivet pin received in the fourth positioning slot abuts against a top end of the inclined side of the trapezoid of the fourth positioning slot and the rivet pin received in the fourth positioning slot abuts against the bottom of the trapezoid of the fourth positioning slot, the rivet pin received in the fourth positioning slot being spaced from the top of the trapezoid of the fourth positioning slot by a fifth distance to serve as a preserved space for expansion of the light guide plate in the direction of the second and fourth positioning slots, the fifth distance being determined according to difference in thermal expansion between the light guide plate and the backplane; and wherein length of the bottom of the first positioning slot minus length of the top of the first positioning slot and further minus a sixth distance is equal to length of the bottom of the second positioning slot minus length of the top of the second positioning slot, the sixth distance being a preserved space for expansion of the light guide plate in the direction of the first and second positioning slots; and length of the bottom of the third positioning slot minus length of the top of the third positioning slot and further minus a seventh distance is equal to length of the bottom of the fourth positioning slot minus length of the top of the fourth positioning slot, the seventh distance being a preserved space for expansion of the light guide plate in the direction of the third and fourth positioning slots.

8. A side-edge backlight module, comprising: a backplane, a backlight source arranged inside the backplane, and a light guide plate arranged inside the backplane and corresponding to the backlight source, the light guide plate comprising a light incidence side and a first mounting side and a second mounting side that are opposite to each other and are located at two ends of the light incidence side, the backlight source being set to correspond to the light incidence side, the first mounting side forming a first positioning hole and two first positioning slots, the second mounting side forming a second positioning hole corresponding to the first positioning hole, the second mounting side forming two second positioning slots to respectively correspond to the first positioning slots, the backplane comprising six rivet pins mounted thereon to be respectively received in the first and second positioning holes and the first and second positioning slots in order to effect positioning of the light guide plate, the first positioning slots being of a right-angle trapezoidal shape with a straight side thereof open and an inclined side being inclined downward in a direction toward the first positioning hole, the second positioning slots being of a right-angle trapezoidal shape with a straight side thereof open and an inclined side being inclined downward in a direction toward the second positioning hole, the rivet pins received in the first and second positioning slots abutting against the inclined sides of the trapezoids.

9. The side-edge backlight module as claimed in claim 8, wherein the first mounting side forms, at a position close to the light incidence side, a first positioning hole and also forms, in a middle position and an end position remote from the first positioning hole, first positioning slots and corresponding to the first positioning hole, the second mounting side forms, at a position close to the light incidence side, a second positioning hole and corresponding to the first positioning slots, the second mounting side forms, in a middle position and an end position remote from the second positioning hole, second positioning slots.

10. The side-edge backlight module as claimed in claim 8, wherein the first and second positioning holes are of a rectangular shape having one side open, whereby in room temperature, the rivet pin received in the second positioning hole abuts against a bottom side of the second positioning hole, while the rivet pin received in the first positioning hole is spaced from the bottom side of the first positioning hole by a first distance to serve as a preserved space for expansion of the light guide plate in the direction of the first and second positioning holes, the first distance being determined according to difference in thermal expansion of the light guide plate and the backplane, the rivet pins received in the first and second positioning holes being respectively in contact engagement with two lateral sides of the first and second positioning holes.

11. The side-edge backlight module as claimed in claim 8, wherein in room temperature, the rivet pins received in the first positioning slots abut against top ends of the inclined sides of the trapezoids of the first positioning slots and the rivet pins received in the first positioning slots abut against the tops of the trapezoids of the first positioning slots, the rivet pins received in the first positioning slots being spaced from the bottoms of the trapezoids of the first positioning slots by a second distance to serve as a preserved space for expansion of the light guide plate in the direction of the first positioning slots, the second distance being determined according to difference in thermal expansion between the light guide plate and the backplane; in room temperature, the rivet pins received in the second positioning slots abut against top ends of the inclined sides of the trapezoids of the second positioning slots and the rivet pins received in the second positioning slots abut against the bottoms of the trapezoids of the second positioning slots, the rivet pins received in the second positioning slots being spaced from the tops of the trapezoids of the second positioning slots by a third distance to serve as a preserved space for expansion of the light guide plate in the direction of the second positioning slots, the third distance being determined according to difference in thermal expansion between the light guide plate and the backplane, length of the bottoms of the first positioning slots minus length of the tops of the first positioning slots and further minus a fourth distance being equal to length of the bottoms of the second positioning slots minus length of the tops of the second positioning slots, the fourth distance being a preserved space for expansion of the light guide plate in the direction of the first and second positioning slots, the fourth distance being determined according to different in thermal expansion between the light guide plate and the backplane.

* * * * *